Jan. 6, 1925.

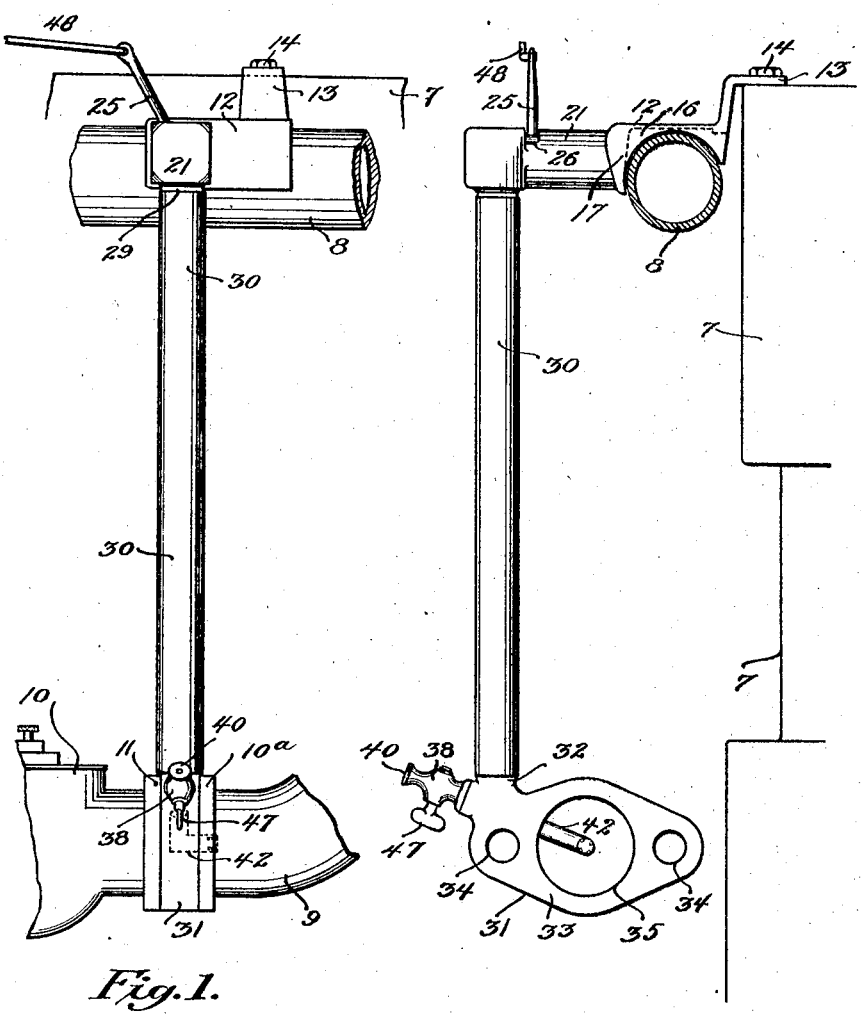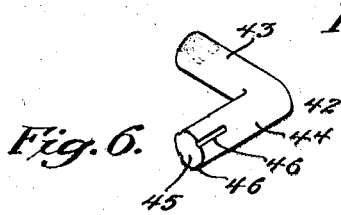

J. E. BROWN 1,521,994

AUXILIARY AIR INLET DEVICE

Filed Dec. 19, 1921

2 Sheets-Sheet 2

Witnesses
Frederic C. Whitney
Augustus B. Coppes

Inventor
John E. Brown
by Joshua R. H. Potts
His Attorney

Patented Jan. 6, 1925.

1,521,994

UNITED STATES PATENT OFFICE.

JOHN E. BROWN, OF CHESTER, PENNSYLVANIA.

AUXILIARY AIR-INLET DEVICE.

Application filed December 19, 1921. Serial No. 523,371.

*To all whom it may concern:*

Be it known that I, JOHN E. BROWN, a citizen of the United States, residing at Chester, in the county of Delaware and State of Pennsylvania, have invented certain new and useful Improvements in an Auxiliary Air-Inlet Device, of which the following is a specification.

One object of my invention is to provide an improved device for use in connection with an internal combustion engine for the purpose of increasing the power and effecting economy in the running of the engine.

Another object is to so construct my improved device that it can be conveniently used for the purpose of removing carbon deposit from the engine.

A still further object is to so make the parts of my improved device that they can be readily adjusted to compensate for different positions in various engines of the parts to which the device is to be attached. These objects, and other advantageous ends which will be described hereinafter, I attain in the following manner, reference being had to the accompanying drawings in which—

Figure 3:
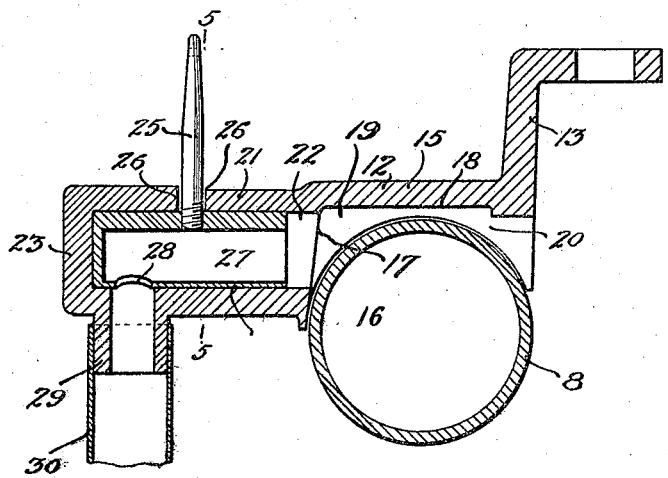
Figure 4:
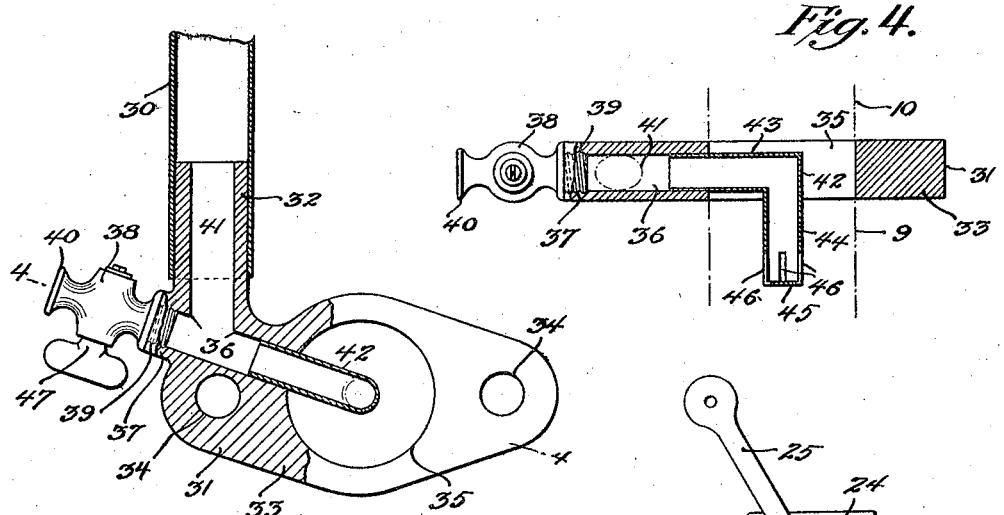
Figure 5:
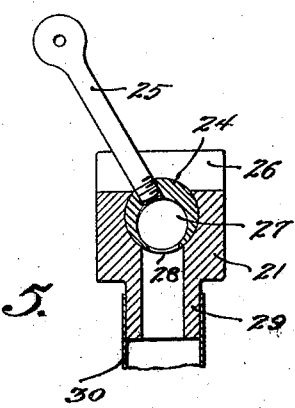

Figure 1 is a front elevation illustrating my device and the manner in which it is attached to an internal combustion engine; said device having a portion attached between the carburetor and the intake manifold, Figure 2 is a side view of Figure 1; the carburetor and intake manifold being omitted, Figure 3 is an enlarged section of the device; a part of the telescoping tube or pipe being broken away, Figure 4 is a section taken on the line 4—4 of Figure 3, Figure 5 is a section taken on the line 5—5 of Figure 3, and Figure 6 is a perspective view of the hot air injector which forms a part of my invention.

Referring to the drawings, 7 represents a body portion of an internal combustion engine, 8 represents the exhaust pipe for the hot exhaust gases from said engine. A gas intake manifold for said engine is shown at 9, and the carburetor is illustrated at 10. In the form illustrated, the exhaust pipe or manifold 8 is located in a position spaced slightly below the top of the body portion 7 and the carburetor and gas intake manifold are positioned below the exhaust pipe and these elements may be of any of the usual form; said intake manifold having a flange 10ª which usually is adapted to be secured to the flange 11 of the carburetor so that the gas from the carburetor can pass into the intake manifold and be supplied to the engine for the purpose of operating the engine in the usual manner.

In carrying out my invention I provide a hood 12 which is preferably made of cast metal having an angular arm 13 adapted to be secured by a bolt 14 to the top of the engine body 7. This hood has a top plate portion 15 which, at its opposite ends, has depending flanges 16; the lower edges of said flanges being curved so as to fit over the top of the exhaust pipe 8, as clearly shown in Figures 2 and 3.

The hood 12 has an inner side surface 17 leading upward between the flanges 16 and joining the lower surface 18 of the plate portion 15 so that a space or pocket will be formed above the exhaust pipe when the hood is in position, and said pocket will have an opening 20 to allow air to pass therein over the top of the exhaust pipe. The hood has a tubular extension 21 providing a cylindrical bore or cavity 22 which at its outer end communicates with the pocket 19; the opposite end of said cavity being closed by the part 23 of the extension 21.

A cylindrical valve 24 is rotatably mounted in the cavity 22 and said valve has an actuating lever 25 secured thereto; said lever extending upward through a slot 26 in the extension 21 so that by moving said lever 25 transversely to the extension, the valve 24 can be rocked in the cavity. The valve 24 has a passage 27 which communicates with the pocket 19; said valve also having a port 28 which communicates with the interior of a nipple 29 which depends from the extension 21. An upright pipe 30 has its upper end in telescoping connection with the nipple 29. A distributing member 31 has an upwardly extending nipple 32 which telescopically fits within the lower end of the upright pipe 30.

This distributing member has a portion 33 provided with parallel opposite sides and is adapted to be interposed between the flanges 10ª and 11 of the intake manifold 9 and carburetor 10 respectively; the portion 33 having bolt holes 34 adapted to register with the bolt holes in said latter flanges for the purpose of bolting the parts together so that the member 31 will be interposed between the carburetor and the intake manifold. The portion 33 of the distributing member has a large hole 35 which extends entirely therethrough and which registers with the interior of the gas intake manifold and the outlet portion of the carburetor. The distributing member 31 is bored to provide a passage 36 which extends at a slant so as to intercept the hole 35; said bore also extending through a boss 37.

A valve 38 is screwed into the end portion 39 of the passage 36 and this valve preferably has a part 40 to which a hose can be connected for a purpose hereinafter described. The passage 41 of the nipple 32 intersects the passage 36 at its top so that said passage 36 is in communication with the interior of the upright pipe 30.

A hot air injector 42 comprises a tube having portions 43 and 44 which extend at right angles to each other; the portion 43 being fitted in the lower end of the passage 36 while the portion 44 extends axially through the hole 35 and points toward the middle of the passage within the gas intake manifold 9. The end 45 of the part 44 is closed and said part 44 has a number of annularly arranged slots 46 which extend inwardly from said end lengthwise of the portion 44, as clearly shown in Figures 1, 2 and 4. These slots 46 can be made exceptionally small so as to form slits.

In operation the hot gases passing through the exhaust pipe 8 will heat said pipe to an extremely high temperature and the air within the pocket 19 of the hood 12 will become heated and, when the valve 24 is turned with the port 28 in registry with the interior of the nipple 29 and pipe 30, the action of the engine, during the establishment of a suction through the intake manifold, will draw the gas from the carburetor and will also draw the hot air through the slots 46 in the hot air injector 42 and said hot air will emanate in radial lines from the slots 46 in the form of planes or ribbons and will become mixed with the gas so as to heat the latter and also form a more readily combustible mixture which will add great power to the engine, as has been found in actual use of the device.

By providing the valve 38 with a stem portion 47 which can be turned by the fingers to open the valve, fluids, such as coal oil, water or other solution, can be supplied so as to run through the injector 42 and such fluids when taken into the engine, due to the suction established, will loosen the carbon so that the engine can be kept free of carbon deposit.

It will be noted that by the arrangement of the parts, any variation in the alignment or position of the intake manifold, carburetor or exhaust pipe can be compensated for since the niple 32 can turn or move lengthwise relatively to the pipe 30 as can also the nipple 29. In other words, the distributing member can be swung in various positions with the axes of the nipples and pipe 30 as a pivot. Furthermore the distributing member 33 can be readily moved toward or from the hood portion and in view of this construction, the device of my invention is applicable to engines and their necessary parts even though said engine has said parts in different positions.

The lever 25 can be actuated by any suitable mechanism, such for example as by the connection of a link rod 48, and said link rod can be extended to a position adjacent the driver's seat if the device is used in connection with an automobile so that the amount of hot air can be regulated and if desired can be entirely cut off.

By providing the hood with the flanges, the hot air will be confined within the pocket so that if the device is placed upon a movable vehicle, the action of the vehicle will not tend to disturb the pocketed hot air under the hood.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A device of the character described including a member mounted adjacent the exhaust manifold of an internal combustion engine providing a pocket and having depending flanges with curved edges conforming to the curvature of a portion of the manifold and having a nipple formed thereon with a passage in open communication with the pocket, a distributing member adapted to be positioned between a carburetor and an intake gas pipe of the internal combustion engine and having open communication between the carburetor and the intake pipe and provided with a passage in communication with the opening and having a nipple formed thereon with a passage in communication with the passage in communication with the opening, a pipe having rotatable and slidable connection with the nipples opening communication between the pocket and the distributing member, and a hot air injector having an end portion insertable in the passage communicating with the opening and having a portion extending lengthwise with respect to the gas intake pipe.

2. A device of the character described including a hot air hood; a distributing member adapted to be positioned between a carburetor and a gas intake conduit for an internal combustion engine; a pipe in rotatable and sliding connection between said hood and said distributing member; and a hot air injector carried by said distributing member and having an end portion with radial slots extending lengthwise in said conduits adapted to deliver hot air from said hood through the medium of said pipe into said intake gas conduit; substantially as described.

3. A device of the character described including a hot hair hood; a distributing member adapted to be positioned between a carburetor and a gas intake conduit for an internal combustion engine; a pipe in rotatable and sliding connection between said hood and said distributing member; and a hot air injector carried by said distributing member and adapted to deliver hot air from said hood through the medium of said pipe into said intake gas conduit, said injector including a tube having angular portions, one of said portions extending lengthwise with respect to said gas conduit and having a closed end and slots extending lengthwise inward from said end; substantially as described.

In testimony whereof I have signed my name to this specification in the presence of two subscribing witnesses.

JOHN E. BROWN.

Witnesses:
 CHAS. E. POTTS.
 ELIZABETH GARBE.